US006742550B2

(12) United States Patent
Caparros

(10) Patent No.: US 6,742,550 B2
(45) Date of Patent: Jun. 1, 2004

(54) SECONDARY CONTAINMENT CAP APPARATUS FOR EITHER PERMANENT OR REMOVABLE ATTACHMENT TO A PRIMARY CHLORINE CONTAINER TURRET

(76) Inventor: Rudolph Caparros, 3641 Turnberry Cir., Santa Rosa, CA (US) 95430

(*) Notice: Subject to any disclaimer, the term of this patent is extended or adjusted under 35 U.S.C. 154(b) by 0 days.

(21) Appl. No.: 10/163,010

(22) Filed: Jun. 4, 2002

(65) Prior Publication Data

US 2002/0148530 A1 Oct. 17, 2002

Related U.S. Application Data

(63) Continuation-in-part of application No. 09/452,398, filed on Dec. 1, 1999, and a continuation-in-part of application No. 09/501,911, filed on Feb. 10, 2000, now Pat. No. 6,302,166.

(51) Int. Cl.[7] .................. B65B 1/04; A01M 7/00

(52) U.S. Cl. .................. 141/86; 141/311 A; 141/88; 137/347

(58) Field of Search .................. 141/86, 311 A, 141/88; 220/571, 254.1, 254.3, 254.5, 256.1; 105/360; 137/350, 347, 382, 377, 351

(56) References Cited

U.S. PATENT DOCUMENTS

| | | | | | |
|---|---|---|---|---|---|
| 1,156,469 | A | * | 10/1915 | Dodge | 137/347 |
| 1,549,770 | A | * | 8/1925 | Holmes | 137/377 |
| 1,827,574 | A | * | 10/1931 | Frazier | 137/382 |
| 1,934,069 | A | * | 11/1933 | Ittner | 220/288 |
| 2,102,124 | A | * | 12/1937 | Lithgow | 105/358 |
| 2,290,038 | A | * | 7/1942 | Folmsbee | 137/382 |
| 2,635,628 | A | * | 4/1953 | Stamper | 137/382 |
| 2,765,948 | A | * | 10/1956 | Paley et al. | 220/830 |
| 2,873,043 | A | * | 2/1959 | Folmsbee | 220/324 |
| 3,197,061 | A | * | 7/1965 | Graves | 220/327 |
| 3,786,955 | A | * | 1/1974 | Mowatt-Larssen | 220/327 |
| 3,963,144 | A | * | 6/1976 | Berwald | 137/382 |
| 4,347,863 | A | * | 9/1982 | Keyes | 137/347 |
| 4,542,764 | A | * | 9/1985 | Brittingham et al. | 137/347 |
| 5,158,022 | A | * | 10/1992 | Dugge et al. | 105/377.07 |
| 5,201,151 | A | * | 4/1993 | LeBlanc et al. | 52/20 |
| 5,394,650 | A | * | 3/1995 | Dean | 49/386 |
| 5,588,461 | A | * | 12/1996 | Plecnik | 141/311 A |
| 5,924,672 | A | * | 7/1999 | Crochet et al. | 137/382 |
| 6,076,471 | A | * | 6/2000 | Burian et al. | 105/358 |
| 6,199,414 | B1 | * | 3/2001 | Chang | 70/168 |
| 6,390,119 | B1 | * | 5/2002 | Crochet et al. | 137/347 |

FOREIGN PATENT DOCUMENTS

EP 0999311 A1 * 5/2000

OTHER PUBLICATIONS

Derwent –Acc–No. 2002–538485.*

* cited by examiner

*Primary Examiner*—Michael Mar
*Assistant Examiner*—Khoa Huynh
(74) *Attorney, Agent, or Firm*—Frank L. Kubler

(57) ABSTRACT

A secondary containment cap apparatus for a turret of a hazardous fluid primary container having a primary container wall with a primary container turret opening having a turret opening perimeter wall, the secondary containment cap apparatus including a valve mounting plate extending over and covering the turret opening in sealing relation with the perimeter wall, the valve mounting plate having at least one valve port fitted with a fluid passing container valve; a containment cap including a cap wall with a concave cap interior and a cap abutment port, the cap abutment port having a cap abutment port rim, the containment cap being secured onto the valve mounting plate so that the container cap covers and encloses the fluid passing container valve, the cap abutment port rim being sealingly retained to the valve mounting plate; and a cap attachment structure securing the valve mounting plate to the perimeter wall.

22 Claims, 4 Drawing Sheets

SECONDARY CONTAINMENT CAP APPARATUS FOR EITHER PERMANENT OR REMOVABLE ATTACHMENT TO A PRIMARY CHLORINE CONTAINER TURRET

This application is a continuation-in-part of application Ser. No. 09/452,398, filed on Dec. 1, 1999, and a continuation-in-part of application Ser. No. 09/501,911, filed on Feb. 10, 2000 now U.S. Pat. No. 6,302,166.

BACKGROUND OF THE INVENTION

1. Field of the Invention

The present invention relates generally to the field of environmental protection mechanisms. More specifically the present invention relates to a secondary containment cap apparatus for incorporating into the turret structure of a hazardous fluid primary container to provide secondary containment against fluid leakage into the natural environment from liquid and vapor passing container valves. Such primary containers may be free-standing or vehicle-mounted. The hazardous fluid within the primary container is a gas or a liquid or a combination of the two, which is poisonous, caustic or otherwise health threatening, such as chlorine and sulphur dioxide liquified gas.

The turret of each type of primary container includes a turret opening in the primary container wall with a tubular turret opening perimeter wall extending outwardly from the container wall and having a perimeter wall rim, and the secondary containment cap apparatus fits and is sealingly secured to the turret opening perimeter wall with high tension bolts mounting through existing bolt holes, such as in a turret mounting flange protruding laterally from the perimeter wall rim, and retains any gas leaking from the liquid and vapor valves into the interior of the cap apparatus to prevent escape into the environment. The cap apparatus preferably includes a valve mounting plate mounted sealingly across the perimeter wall rim, the valves extending through and being sealingly secured within the valve mounting plate, and a containment cap which, in its essential form, includes a substantially cup- or bubble-shaped cap wall defining a concave cap interior and a cap abutment port surrounded by a cap port rim fitting sealingly against the valve mounting plate to enclose the valves, vapor release means for controlled release of gas contained within the cap wall into secure containers or scrubber means, and attachment means for securing the valve mounting plate to the primary container with the valve mounting plate sealingly fitted against the turret opening perimeter wall rim. The cap wall preferably is a wide cylindrical tube with an open cap side wall remote end and a cap wall mounted end welded onto the valve mounting plate, and a spring-loaded hinged hatch is sealingly secured onto the open cap side wall remote end.

2. Description of the Prior Art

In recent years there have been numerous instances of chlorine gas released from bulk storage tanks, railroad tanker cars, tanker trucks and barges. Many communities have adopted new regulations requiring containment of toxic gas releases, such as Article 80 of the Uniform Fire Code and the Toxic Gas Ordinance. A problem with existing chlorine tanks and valves has been that they have no secondary containment, so that a release of chlorine from the tank or tank valving causes an instant and life threatening discharge of chlorine gas. Valves within valve mounting turrets of tank railroad cars, trucks and barges, and bulk storage tanks are particularly prone to hazardous leakage. Yet valve covers provided on existing, prior art valve mounting turrets are not pressure covers and are not configured, are not of sufficient gauge and are not otherwise designed to provide secondary containment around the valves in the event of a hazardous gas leak. Furthermore, these prior covers do not include release valves for metered release of any gas which might enter the cover and do not provide fail-safe shut down of release in the event of unauthorized movement, earthquakes or detection of other gas leakage.

There have in recent years been devices intended for containing and scrubbing chlorine gas leaking from cylinders, and vehicles. These devices traditionally have included a hood or building structure placed around the leaking cylinder or vehicle and a scrubber apparatus for gradually removing the chlorine gas from the air within the hood or building. A problem with these devices has been that the containment buildings and hoods are not capable of withstanding the pressure and corrosive nature of suddenly released quantities of chlorine gas. Being largely intended for ton and 150 pound chlorine gas cylinders, such technology is wholly ineffective and unsuited for the large, perhaps 90 ton tanks found on chlorine transport vehicles and the sometimes massive stationary bulk storage tanks.

A solution to the problem of safely draining leaking chlorine cylinders has been found and is disclosed in U.S. Pat. Nos. 5,607,384 and 5,819,787, issued on Mar. 4, 1997 and Dec. 13, 1998, respectively, to the present applicant. These patents disclose sealing leaking chlorine cylinders in a pressure-withstanding secondary containment vessel, resembling on some ways an iron lung. Gas is slowly released through a valve in the secondary containment vessel to a scrubber apparatus of conventional design at a suitable metered rate. In the event of a catastrophic rupture and sudden release of gas from the cylinder, the secondary containment vessel entirely and safely contains the released gas, which once again is discharged at a suitable rate to a scrubber apparatus or put into process. A limitation to this approach is that it is impractical to build secondary containment vessels of the type disclosed in these patents which are large enough to receive bulk storage tanks and chlorine transport vehicles, and it is impractical to attempt to move such a leaking storage tank or tanker vehicle to the site of such a massive vessel or to move the massive vessel to and around the tanker vehicle. Additionally, there are so many sizes and shapes of tanks and transport vehicles that no single size and shape of receiving vessel could be suitable for all of them. Further a hood or alternative method may not fully comply with fire codes.

It is thus an object of the present invention to provide a secondary containment cap apparatus for enclosing release ports and liquid and vapor passing valves mounted in the release ports within a turret of a primary container such as a hazardous fluid containment bulk storage or vehicle tank, the containment cap apparatus being manufactured separately from the primary container, so that any fluid subsequently leaking from the valves or release ports of the primary container is contained within the containment cap apparatus and can be drained off through a port and valve in the cap apparatus into cylinders or other receiving means in the conventional way for ordinary usage, and in which the secondary containment cap apparatus is capable of withstanding the maximum hazardous fluid pressure which can be exerted by the quantity of retained hazardous fluid so that the natural environment is safely shielded from the hazardous fluid. As a result, there is no need to go to the considerable expense of scrubbing the leaking fluid and no need to expose anyone to the dangers involved in such a clean-up operation.

It is more specifically an object of the present invention to provide such a cap apparatus which encloses the gas release ports and valves of the primary container in a limited secondary containment structure which is less expensive than providing secondary containment of the entire primary container.

It is a further object of the present invention to provide such a cap apparatus which can be permanently or removably secured with high tension bolts fitted into existing bolt passing holes or notches manufactured as an original structure of the primary container, and which provides safe containment during primary container transport and operation at the job site.

It is an additional object of the present invention to provide such a cap apparatus in which the primary container gas release port is fitted with a remote operating container valve which is operable from outside the containment cap apparatus so that the valve can be operated without entering the containment cap apparatus and no personnel are therefore exposed to leaking hazardous fluid.

It is a further object of the present invention to provide such a cap apparatus which is equipped with a hazardous fluid pressure/vacuum gauge and detection devices for indicating leaks and optionally for indicating completed draining of hazardous fluid from the cap structure.

It is still another object of the present invention to provide such a cap apparatus which complies with Article 80 of the Uniform Fire Code and with the California Toxic Gas Ordinance.

It is yet another object of the present invention to provide such a cap apparatus which has fail-safe valves connected to its release fittings, the fail-safe valves being electrically wired to a motion and impact sensor, and connected to a hazardous fluid leakage sensor, which rapidly closes the fail-safe valve in the event of an earthquake, an attempt to move the primary container without authorization, or a hazardous fluid leak, and which can be easily adapted to existing tank design for low cost installation.

It is finally an object of the present invention to provide such a cap apparatus which is easy to use and is highly reliable, simple in design, safe, virtually maintenance free, compact, and can be manufactured at an expense relatively comparable to or lower than that of existing containment systems.

SUMMARY OF THE INVENTION

The present invention accomplishes the above-stated objectives, as well as others, as may be determined by a fair reading and interpretation of the entire specification.

A secondary containment cap apparatus is provided for incorporating into a turret of a primary container for containing a hazardous fluid, the primary container having a primary container wall with a primary container turret opening having a turret opening perimeter wall and a perimeter wall rim, the secondary containment cap apparatus including a valve mounting plate extending over and covering the turret opening in sealing relation with the perimeter wall, the valve mounting plate having at least one valve port fitted with a fluid passing container valve; a containment cap including a cap wall shaped to define a concave cap interior and a cap abutment port, the cap abutment port having a cap abutment port rim, the containment cap being secured onto the valve mounting plate so that the container cap covers and encloses the fluid passing container valve, the cap abutment port rim being retained in sealing relation with the valve mounting plate to provide secondary containment of the fluid passing container valve; and cap attachment structure securing the valve mounting plate to the perimeter wall.

The apparatus preferably additionally includes a mechanism for controlled release of the fluid through the cap wall. The cap wall preferably includes an outer access port and an outer access hatch removably and sealingly covering the outer access port. The outer access hatch preferably is secured to the outer access port with a hatch hinge. The apparatus preferably additionally includes a hatch spring biasing the outer access hatch into a closed position on the outer access port. The apparatus preferably additionally includes a hatch bolting structure for releasibly bolting the outer access hatch onto the cap wall in a closed position on the outer access port. The cap attachment mechanism preferably includes fasteners interconnecting the perimeter wall rim and the valve mounting plate. The apparatus preferably additionally includes a gasket compressed and creating a seal between the valve mounting plate and the perimeter wall rim.

The perimeter wall rim preferably includes a turret mounting flange and the cap attachment structure preferably includes bolt passing flange openings in the turret mounting flange and bolt passing plate openings in the valve mounting plate registering with the bolt passing flange openings and includes several bolts, each the bolt extending through one of the bolt passing flange openings and through a corresponding and registering bolt passing plate opening, thereby securing the turret mounting flange and the valve mounting plate together.

The at least one fluid passing container valve preferably includes at least one liquid passing valve and at least one vapor passing valve. The at least one fluid passing container valve preferably includes a valve intake orifice in fluid communication with the at least one fluid release port and preferably includes a valve discharge orifice, the apparatus additionally including a lateral valve pipe extending through the cap wall and having a lateral pipe valve end connected to the at least one fluid passing container valve and having a lateral pipe remote end extending outside the container cap, so that fluid passing through the at least one fluid passing container valve can be released through the lateral pipe remote end outside the containment cap.

The apparatus preferably additionally includes a fail-safe valve secured to and in fluid communication with the lateral pipe remote end. The apparatus preferably still additionally includes a motion detector including a signalling mechanism in communication with the fail-safe valve for automatically closing the fail-safe valve upon detection of primary container, and an external hazardous fluid detector including a signalling mechanism in communication with the fail-safe valve for automatically closing the fail-safe valve upon detection of hazardous fluid outside the primary container, and an alarm sound generator connected to the motion detector signaling mechanism for automatically initiating the generation of an alarm sound upon detection of primary container movement.

The apparatus preferably still additionally includes an alarm sound generator connected to the external hazardous fluid detector signaling mechanism for automatically initiating the generation of an alarm sound upon detection of hazardous fluid outside the primary container. The apparatus optionally additionally includes a second internal hazardous fluid detector located between the primary container wall and the cap wall for detecting leakage of hazardous fluid from the primary container.

BRIEF DESCRIPTION OF THE DRAWINGS

Various other objects, advantages, and features of the invention will become apparent to those skilled in the art from the following discussion taken in conjunction with the following drawings, in which.

Prior Art

Prior Art

DETAILED DESCRIPTION OF THE PREFERRED EMBODIMENTS

Figure 1:
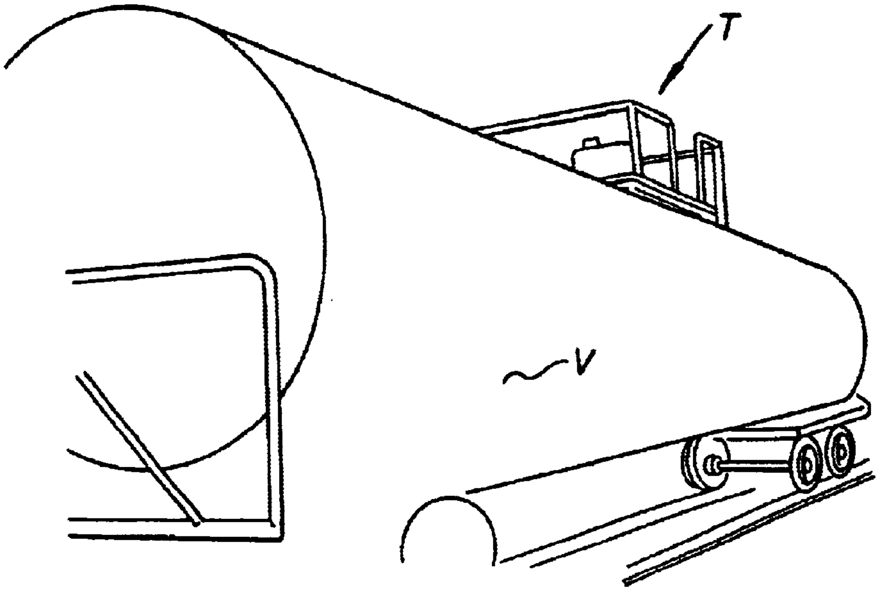
FIG. 1 PRIOR ART
FIG. 1 is a perspective side view of a railroad tank car having the conventional valve containing turret on top.
Figure 2:
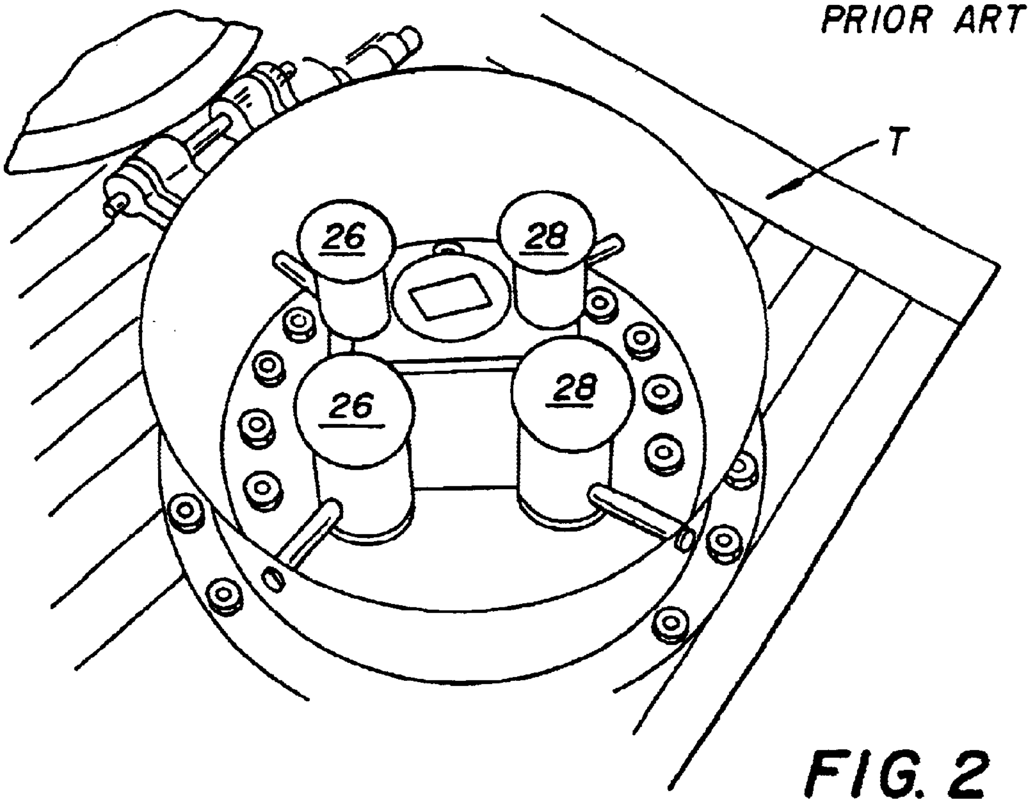
FIG. 2 PRIOR ART
FIG. 2 is a perspective top view of a conventional valve containing turret which is open to reveal the fluid and vapor passing container valves. Note that the orientation of the valves or directly toward the turret side wall, unlike their orientation in the present invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 3:
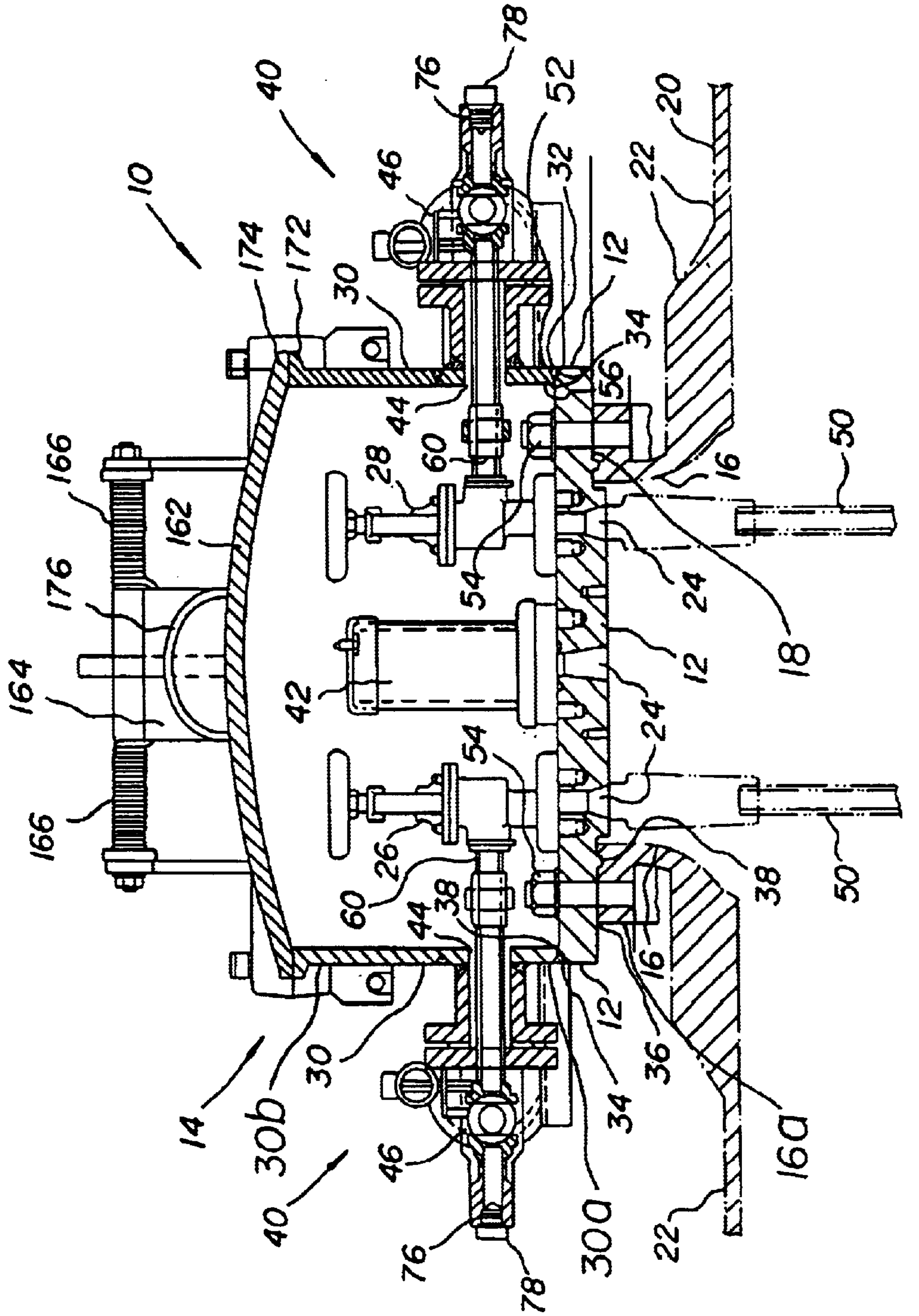
FIG. 3 is a cross-sectional side view of a portion of the side wall of the primary container, in this instance of a 102" I. D. DOT 105A500W tank car, of the turret opening, turret opening perimeter wall and turret mounting flange, and of the inventive containment cap apparatus including the valve mounting plate, the cap side wall, outer access hatch and fail safe valves, and discharge valves.
Figure 4:
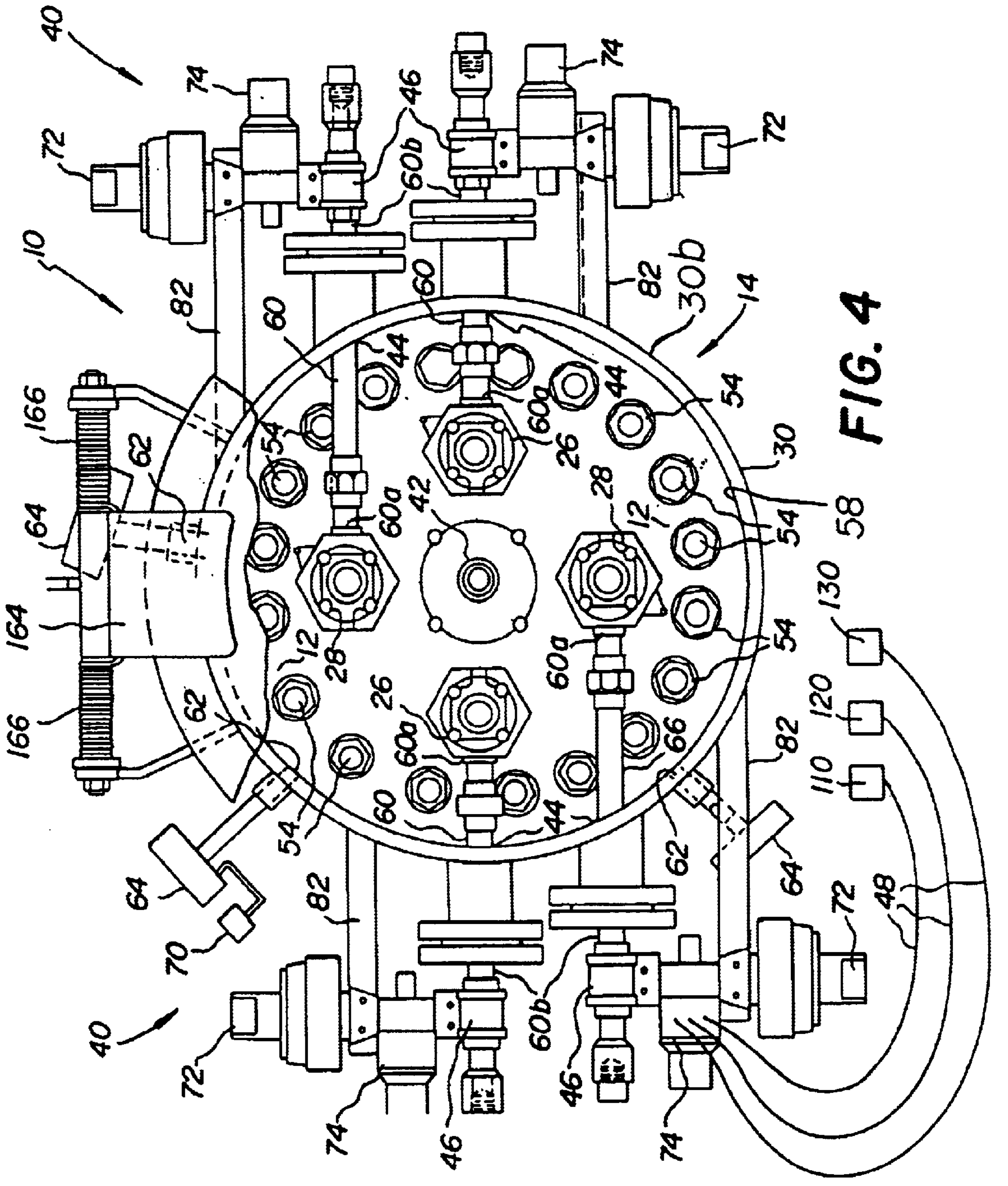
FIG. 4 is a top view of the cap apparatus of FIG. 3, with most of the outer access hatch cut away to reveal the locations of the fluid and vapor discharge valves and the directions of the lateral valve pipes, the high tension bolts holding the valve mounting plate in sealing contact with the turret opening primary container perimeter wall rim.
Figure 5:
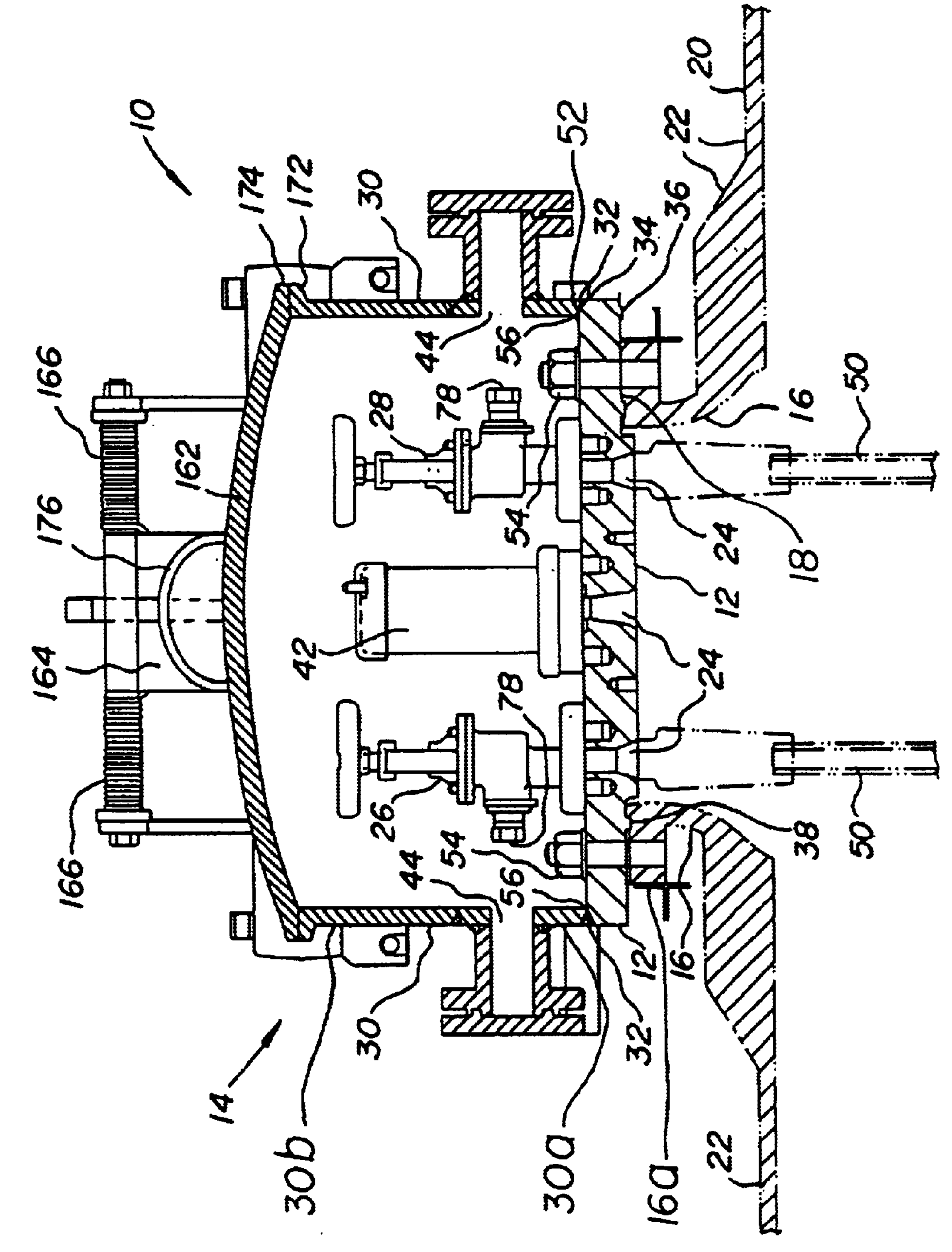
FIG. 5 is a cross-sectional side view of the portion of the side wall of the primary container, in which the lateral valve pipes are removed and the liquid and vapor passing container valves are securing capped for primary container transport.

Referring to FIGS. 3–5, a secondary containment cap apparatus 10 is disclosed for incorporating into a valve mounting turret 100 of a primary container 20 containing a hazardous fluid, the primary container 20 having a primary container wall 22 with a primary container turret opening 14, a tubular and outwardly protruding tubular turret opening perimeter wall 16 with a perimeter wall rim 18 including a turret mounting flange 16*a* extending radially from the rim 18. The secondary containment cap apparatus 10 provides turret mounted liquid and vapor passing container valves 26 and 28 with secondary containment against leakage into the natural environment.

The term "primary container" for purposes of this application may be vehicle mounted or free standing, and includes but is not limited to tanks mounted to tank carrying vehicles V such as railroad tanker cars, tanker trucks and barges, as well as and bulk storage tanks B. The term "fluid" for purposes of this application broadly includes liquids and gases, whether existing separately or in combination with each other within the primary container 20. The hazardous fluid within the primary container 20 is a fluid which is poisonous, caustic or otherwise health threatening, such as chlorine and sulphur dioxide liquefied gas.

Cap apparatus 10 includes a valve mounting plate 12 mounted sealing onto the perimeter wall rim 18, the liquid and vapor passing container valves 26 and 28 and a primary container pressure relief device 42 extending through valve ports 24 in and being secured to the valve mounting plate 12, and includes a containment cap 14 which, in its essential form, is a substantially cup- or bubble-shaped cap wall 30 defining a concave cap interior I and a cap abutment port 32 surrounded by a cap port rim 34 shaped to follow and fit sealingly against the valve mounting plate 12 to enclose the valves 26 and 28, the cap wall 30 having release means 40 for controlled release of gas contained within cap wall 30 into secure containers or scrubber means, and includes cap attachment means 52 such as special high tension bolts 54 for securing the valve mounting plate 12 to the turret mounting flange 28. The cap wall 30 preferably is configured as a wide cylindrical tube which includes a cap side wall mounted end 30*a* sealingly secured to the valve mounting plate 12 with a bead or weld 56 and a cap side wall remote end 30*b*. The valve mounting plate 12 preferably includes a cap side wall groove 38 following a circular path, into which an edge of the cap side wall mounted end 30*a* is fitted prior to welding. An outer access hatch 162 preferably is mounted to the cap side wall remote end 30*b* with a hatch hinge 164 and hatch handle 176 and preferably is spring biased with a hinge spring 166 to a closed and sealing position onto cap side wall remote end 30*b*. A locking device optionally is provided on hatch 162 to prevent tampering with internal valves such as valves 26 and 28. A side wall flange 172 is preferably provided at cap side wall remote end 30*b* which abuts a hatch perimeter flange 174 and hatch securing bolts preferably pass through registering bolt ports in a double-bolt vertical closure such as a 30" class 300-V manufactured by TUBE TURNS TECHNOLOGIES, INC.™ and releasibly secure hatch 162 in a closed and sealed position against side wall remote end 30*b*.

The containment cap 14 provides a complete seal against hazardous gas release from valve ports 24 and valves 26 and 28 into the surrounding natural environment. As indicated above, the cap wall 30 and hatch 162 are made of any suitable metal or plastic material and are of a thickness which is capable of withstanding the fluid maximum pressure and of resisting the caustic nature of the contained fluid. A sealing gasket 36 preferably is provided between perimeter wall rim 18 and valve mounting plate 12 and preferably is made of a compressible chlorine-resistant material known as VITON™, although numerous other materials which would be resistant to the given contained hazardous fluid are contemplated. Where cap wall 30 is made of a plastic, the cap port rim 34 is sealingly melted onto the valve mounting plate 12 to form a sealing bead 58 of cap wall 30 plastic. Where cap wall 30 is made of either metal or plastic, the attachment means 50 alternatively includes a bonding agent.

Two liquid passing container valves 26 and two vapor passing container valves 28 are preferably provided, each for example being a one inch standard chlorine angle valve, and each passing through a corresponding valve port 24 in valve mounting plate 12. Valves 26 and 28 are provided with manual controls, but also may be remotely controlled. As a result, no personnel need reach into the cap apparatus 10 and risk exposure to any fluid leakage to operate the liquid passing container valve 26. In addition, a pressure relief device 16 preferably is provided, which in the event the hazardous fluid is chlorine, is preferably set at a pressure of 375 psig, is fitted into another valve port 24 as well.

Each valve 26 and 28 has a valve intake orifice in fluid communication with one a valve port 24 in the valve mounting plate 12 and has a valve discharge orifice. An eduction pipe 50 preferably extends from valve intake orifice into the interior of the primary container 20. A lateral valve pipe 60 extends through valve pipe port 44 cap wall 30 and has a lateral pipe valve end 60*a* which is connected to the given fluid passing container valve discharge orifice and has a lateral pipe remote end 60*b* extending outside container cap 14, so that fluid passing through the given fluid passing container valve 26 or 28 can be released through the lateral pipe remote end 60*b* outside containment cap 14. Fitted to the remote, exterior ends of lateral valve pipes 60 are fail safe valves 46 which are electrically connected to one or more event detection devices, such as to a motion detector 110 which detects unauthorized movement of the primary container 20, a seismic detector 120 which detects earthquake tremors, and a hazardous fluid leakage detector 130 which detects leakage of hazardous fluid from the primary container 20. Should any of these detection devices 110, 120 and 130, detect any one or more of these events, the device or devices immediately sends a signal through the failsafe valve wiring 48 to the each fail-safe valve 46 and thereby causes the fail-safe valve 46 to close. Any leaked hazardous fluid secondarily contained within the containment cap 14 is thereby safely retained in cap apparatus 10 until discharge is desired.

Each fail-safe valve 46 preferably includes a valve position indicator 72 indicating the extent of valve closure, a fail safe actuator 74 and the fail-safe valve 46 itself to which the various detection devices 110, 120 and 130 are electrically connected. During primary container 20 transport, the lateral valve pipes 60 are removed and the liquid and vapor passing container valves 26 and 28 are capped with valve caps 78. See FIG. 5. Each fail-safe valve 46 preferably is further supported by a fail-safe valve support bracket mount 82.

Fail-safe valve 46 is preferably a nitrogen powered-electric valve which has a one thousand-pound valve closure biasing spring. A power supply monitor (not shown) preferably is provided which sends a signal over the wiring C in the event of electric power failure; and finally to a nitrogen supply line (not shown) which supplies nitrogen to keep the fail-safe valve 46 open against the biasing of the one thousand-pound spring which permits the biasing spring to close the fail-safe valve 46 upon interruption of the flow of nitrogen to fail-safe valve 46.

It is preferred that there is a pressure relief device (not shown) in cap wall 30. The pressure relief device protects the cap wall 30 from rupture due to over pressurization. References in this description to chlorine are merely exemplary of hazardous fluids generally which are capable of containment in tanks.

At least one, and preferably three, hazardous gas discharge ports 62 preferably are provided in the cap side wall 30 for releasing leaked hazardous gas secondarily contained within the containment cap 14 into suitable receiving containers or scrubbing devices when the receiving containers or scrubbers are connected and ready. Each hazardous gas discharge port 62 is fitted with a discharge valve 64, one discharge valve 64 being fitted with a hazardous fluid detection gauge 70 so that the presence and quantity of hazardous fluid within the cap 14 can be monitored both prior to and during discharge.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A primary container apparatus for containing a hazardous fluid, comprising:

a primary container having a primary container wall with a primary container turret opening having a turret opening perimeter wall and a perimeter wall rim, said primary container containing chlorine gas at a certain chlorine gas pressure;

at least two fluid passing container valves;

a pressure containment cap comprising a cap wall shaped to define a concave cap interior and a cap abutment port, said cap abutment port having a cap abutment port rim;

a valve mounting plate extending over and covering said turret opening in sealing relation with said perimeter wall, said valve mounting plate having at least two valve ports each fitted with one of said fluid passing container valves, said valve mounting plate further comprising a first valve mounting plate attachment means securing said valve mounting plate to said turret opening perimeter wall with at least sufficient connection strength to retain said valve mounting plate in sealing relation with said turret opening perimeter wall against the certain chlorine gas pressure, and a second valve mounting plate attachment means fastening said valve mounting plate to said cap abutment port rim with at least the connection strength of said first valve mounting plate attachment means to retain said container cap in sealing relation with said valve mounting plate against the certain chlorine gas pressure;

wherein said container cap covers and encloses said fluid passing container valves to provide secondary containment of said fluid passing container valves.

2. The apparatus of claim 1, additionally comprising means for controlled release of the fluid through said cap wall.

3. The apparatus of claim 1, wherein said cap wall comprises an outer access port and an outer access hatch removably and sealingly covering said outer access port.

4. The apparatus of claim 3, wherein said outer access hatch is secured to said outer access port with a hatch hinge.

5. The apparatus of claim 4, additionally comprising hatch spring means biasing said outer access hatch into a closed position on said outer access port.

6. The apparatus of claim 4, additionally comprising hatch bolting means for releasibly bolting said outer access hatch onto said cap wall in a closed position on said outer access port.

7. The apparatus of claim 1, wherein said cap attachment means comprises fastener means interconnecting the perimeter wall rim and said valve mounting plate.

8. The apparatus of claim 1, additionally comprising a gasket compressed and creating a seal between said valve mounting plate and the perimeter wall rim.

9. The apparatus of claim 1, wherein the perimeter wall rim comprises a turret mounting flange and wherein said cap attachment means comprises bolt passing flange openings in the turret mounting flange and bolt passing plate openings in said valve mounting plate registering with the bolt passing flange openings and comprises a plurality of bolts, each said bolt extending through one of said bolt passing flange openings and through a corresponding and registering said bolt passing plate opening, thereby securing the turret mounting flange and said valve mounting plate together.

10. The apparatus of claim 1, wherein said at least one fluid passing container valve comprises at least one liquid passing valve and at least one vapor passing valve.

11. The apparatus of claim 1, wherein said at least one fluid passing container valve comprises a valve intake orifice in fluid communication with said at least one fluid release port and comprises a valve discharge orifice, said apparatus additionally comprising a lateral valve pipe extending through said cap wall and having a lateral pipe valve end connected to said at least one fluid passing container valve and having a lateral pipe remote end extending outside said container cap, such that fluid passing through said at least one fluid passing container valve can be released through said lateral pipe remote end outside said pressure containment cap.

12. The apparatus of claim 11, additionally comprising a fail-safe valve secured to and in fluid communication with said lateral pipe remote end.

13. The apparatus of claim 12, additionally comprising:

a motion detection means comprising signalling means in communication with said fail-safe valve for automatically closing said fail-safe valve upon detection of primary container.

14. The apparatus of claim 13, additionally comprising alarm sound generation means connected to said motion detection means signaling means for automatically initiating the generation of an alarm sound upon detection of primary container movement.

15. The apparatus of claim 12, additionally comprising:

a external hazardous fluid detection means comprising signalling means in communication with said fail-safe valve for automatically closing said fail-safe valve upon detection of hazardous fluid outside said primary container.

16. The apparatus of claim 15, additionally comprising alarm sound generation means connected to said external hazardous fluid detection means signaling means for automatically initiating the generation of an alarm sound upon detection of hazardous fluid outside said primary container.

17. The apparatus of claim 12, additionally comprising:

a second internal hazardous fluid detection means located between said primary container wall and said cap wall for detecting leakage of hazardous fluid from said primary container.

18. A primary container for containing a hazardous fluid, comprising:

a primary container having a primary container wall with a primary container turret opening having a turret opening perimeter wall and a perimeter wall rim and containing at least two eduction pipes extending substantially to said primary container turret opening;

a combined pressure containment cap and valve mounting plate, said valve mounting plate being sized to cover said turret opening and having turret engagement and sealing means and having at least two valve ports, each said valve port being fitted with a fluid passing container valve, and eduction pipe engaging means for sealingly connecting each eduction pipe to one of said fluid passing container valves; said pressure containment cap comprising a cap wall shaped to define a concave cap interior and a cap abutment port, said cap abutment port, said valve mounting plate being sealingly secured over and closing said cap abutment port such that said container cap covers and encloses said at least two fluid passing container valves, such that said combined pressure containment cap and valve mounting plate provides secondary containment of said fluid passing container valves.

19. A primary container apparatus for containing a hazardous fluid, comprising:

a primary container having a primary container wall with a primary container turret opening having a turret opening perimeter wall and a perimeter wall rim, said primary container containing chlorine gas at a certain chlorine gas pressure;

at least four fluid passing container valves;

a pressure containment cap comprising a cap wall shaped to define a concave cap interior and a cap abutment port, said cap abutment port having a cap abutment port rim and a valve mounting plate extending over and covering said turret opening in sealing relation with said perimeter wall, said valve mounting plate having at least four valve ports each fitted with one of said fluid passing container valves, said valve mounting plate further comprising a first valve mounting plate attachment means securing said valve mounting plate to said turret opening perimeter wall with at least sufficient connection strength to retain said valve mounting plate in sealing relation with said turret opening perimeter wall against the certain chlorine gas pressure, and a second valve mounting plate attachment means fastening said valve mounting plate to said cap abutment port rim with at least the connection strength of said first valve mounting plate attachment means to retain said container cap in sealing relation with said valve mounting plate against the certain chlorine gas pressure;

wherein said container cap covers and encloses said fluid passing container valves to provide secondary containment of said fluid passing container valves.

20. A secondary containment cap apparatus for incorporating into a turret of a primary container for containing a hazardous fluid, the primary container having a primary container wall with a primary container turret opening having a turret opening perimeter wall and a perimeter wall rim and containing at least two eduction pipes extending substantially to the primary container turret opening, said secondary containment cap apparatus comprising:

a combined pressure containment cap and valve mounting plate, said valve mounting plate being sized to cover the turret opening and having turret engagement and sealing means and having at least two valve ports, each said valve port being fitted with a fluid passing container valve, and eduction pipe engaging means for connecting each eduction pipe to one of said fluid passing container valves;

said pressure containment cap comprising a cap wall shaped to define a concave cap interior and a cap abutment port, said valve mounting plate being sealingly secured to and closing said cap abutment port such that said pressure containment cap covers and encloses said at least two fluid passing container valves, such that said combined pressure containment cap and valve mounting plate provides secondary containment of said at least two fluid passing container valves.

21. A primary container apparatus for containing a gaseous hazardous fluid, comprising:

a primary container having a primary container wall with a primary container turret opening having a turret opening perimeter wall and a perimeter wall rim, said primary container containing a gaseous hazardous fluid at a certain gas pressure;

at least two fluid passing container valves;

a pressure containment cap comprising a cap wall shaped to define a concave cap interior and a cap abutment port, said cap abutment port having a cap abutment port rim and a valve mounting plate extending over and covering said turret opening in sealing relation with said perimeter wall, said valve mounting plate having at least two valve ports each fitted with one of said fluid passing container valves, said valve mounting plate further comprising a first valve mounting plate attachment means securing said valve mounting plate to said turret opening perimeter wall with at least sufficient connection strength to retain said valve mounting plate in sealing relation with said turret opening perimeter wall against the certain gas pressure, and a second valve mounting plate attachment means fastening said valve mounting plate to said cap abutment port rim with at least the connection strength of said first valve mounting plate attachment means to retain said container cap in sealing relation with said valve mounting plate against the certain gas pressure; wherein said container cap covers and encloses said fluid passing container valves to provide secondary containment of said fluid passing container valves.

22. A primary container apparatus for containing a gaseous hazardous fluid, comprising:

a primary container having a primary container wall with a primary container turret opening having a turret opening perimeter wall and a perimeter wall rim, said primary container containing at least two eduction pipes extending substantially to the primary container turret opening and containing a gaseous hazardous fluid at a certain gas pressure;

at least two fluid passing container valves;

a pressure containment cap comprising a cap wall shaped to define a concave cap interior and a cap abutment port, said cap abutment port having a cap abutment port rim and a valve mounting plate extending over and covering said turret opening in sealing relation with said perimeter wall, said valve mounting plate having at least two valve ports each fitted with one of said fluid passing container valves, said valve mounting plate further comprising a first valve mounting plate attachment means fastening said valve mounting plate to said turret opening perimeter wall with at least sufficient connection strength to retain said valve mounting plate in sealing relation with said turret opening perimeter wall against the certain gas pressure, and a second valve mounting plate attachment means fastening said valve mounting plate to said cap abutment port rim with at least the connection strength of said first valve mounting plate attachment means to retain said container cap in sealing relation with said valve mounting plate against the certain gas pressure; wherein said container cap covers and encloses said fluid passing container valves to provide secondary containment of said fluid passing container valves.

* * * * *